United States Patent
Nott

(10) Patent No.: US 6,182,924 B1
(45) Date of Patent: Feb. 6, 2001

(54) BALLAST FOR LIGHTER THAN AIR AIRCRAFT

(76) Inventor: Julian Nott, 46 E. 70th St., New York, NY (US) 10021

(*) Notice: Under 35 U.S.C. 154(b), the term of this patent shall be extended for 0 days.

(21) Appl. No.: 09/094,144

(22) Filed: Jun. 9, 1998

(51) Int. Cl.$^7$ ..................................................... B64B 1/70
(52) U.S. Cl. ............................... 244/95; 244/96; 244/98; 244/61
(58) Field of Search ............................. 244/94, 95, 96, 244/97, 98, 61, 30

(56) References Cited

U.S. PATENT DOCUMENTS

| | | | | |
|---|---|---|---|---|
| 1,035,560 | * | 8/1912 | Erdmann | 244/98 |
| 1,588,147 | * | 6/1926 | Schroder | 244/95 |
| 1,802,586 | * | 4/1931 | Stokes | 244/61 |
| 4,012,016 | * | 3/1977 | Davenport | 244/97 |
| 4,172,048 | * | 10/1979 | Dunlap | 244/97 |

FOREIGN PATENT DOCUMENTS

| | | | | |
|---|---|---|---|---|
| 2518946 | * | 11/1976 | (DE) | 244/61 |

* cited by examiner

Primary Examiner—Galen L. Barefoot
(74) Attorney, Agent, or Firm—Greenberg Traurig LLP

(57) ABSTRACT

A lighter than air aircraft has a non-jettisonable ballast comprised of a liquefied lighter than air gas contained within an insulated container. The liquefied gas is vaporized and released into the lift compartment of the aircraft which is at least partially filled with a lifting gas. A heat exchanger, separate from the means delivering the vaporized gas to the lift compartment, increases the temperature of the vaporized gas prior to entry of the vaporized gas into the lift compartment, wherein the vaporized gas becomes mixed together with lifting gas and whereby damage to the compartment by excessive cooling is minimized.

5 Claims, 1 Drawing Sheet

BALLAST FOR LIGHTER THAN AIR AIRCRAFT

FIELD OF THE INVENTION

Figure 1:
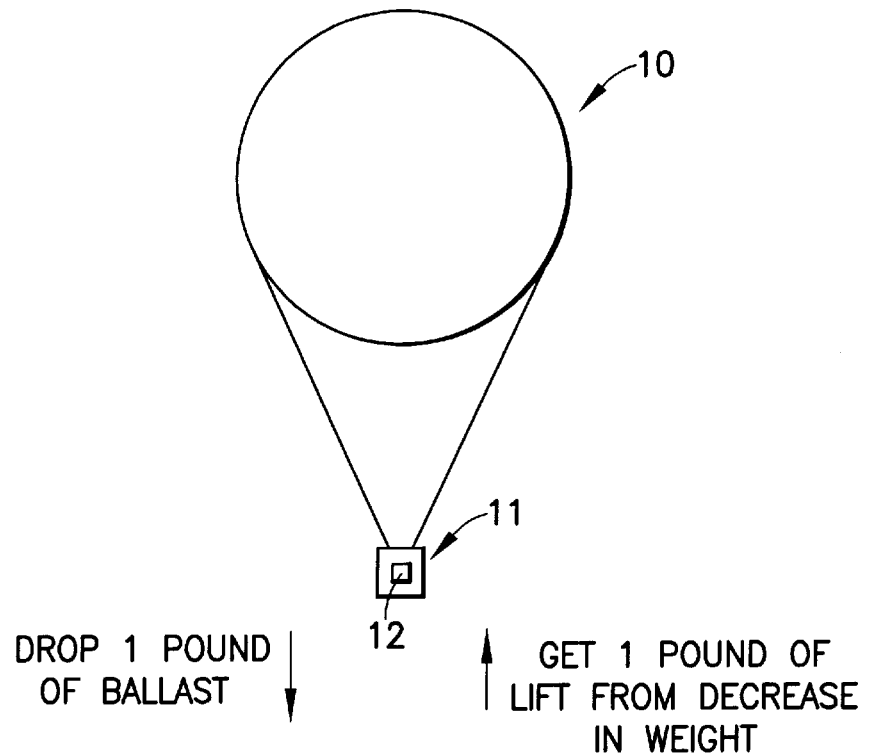

This invention relates to ballast and ballast substitutes for lighter than air aircraft such as balloons, airships and blimps and particularly to aircraft designed to utilize helium (or other light than air, i.e., nitrogen, gases which can be liquefied, such as hydrogen, ammonia and methane) gas for effective lift and with ballast lift control.

BACKGROUND OF THE INVENTION

Lighter than air aircraft which operate by means of lift afforded by buoyant gas, almost always use a means for controlling the effective lift from the gas. This often entails changing the temperature of the gas (hotter gas provides greater lift and vice versa) or by means of ballast. The ballast, typically in the form of a convenient material such as sand and finely divided metal are commonly used. The ballast, provides a drag or control (i.e., extra weight) for maintaining a desired low altitude with higher altitudes being obtained by the jettisoning thereof since the lighter the aircraft, the greater the effect of the lifting gas and the higher the altitude. Ballast is jettisoned when higher altitude is necessary (when a rapid rise is required or heating of the buoyant gas in not feasible or desired) and buoyant gas is released or cooled (hotter gas occupies greater volume with increased lift) to decrease the buoyancy and to lower the altitude. It may also be desirable to use the ballast to reduce or stop descent to make up for loss in lift that may occur from gas leakage or cooling from decrease in either the amount of incident sunlight or of incident infrared radiation from the surrounding. Control of the aircraft is therefore dependent in some measure on the amount of ballast carried by the aircraft. However, once jettisoned, ballast is lost and not renewable for additional use and control. As a result, effective air loft time or flight time is limited by the amount of available ballast. It is usually prudent to land with some ballast still in the craft to make a controlled and safe landing.

As used herein the term "airship" refers to any craft equipped With propelling means through the surrounding air and which derives at least some of its lift from a lifting gas. This includes blimps and all kinds of non-rigid airships as well as airships with a rigid structure, such as those referred to as Zeppelins or dirigibles which obtain all or most of their lift from a lighter than air gas. It also includes all hybrid craft deriving lift partly from a lighter than air gas and partly by aerodynamic lift generated by moving though an atmosphere. Airships can compensate for changes in lift to some degree by using aerodynamic forces generated by moving though the air. Nevertheless, it is common practice to carry ballast in these craft to land in case of engine failure. It is also often desirable to keep an airship close to equilibrium to minimize power needed to generate aerodynamic forces on the craft.

SUMMARY OF THE INVENTION

It is accordingly an object of the present invention to provide an improved ballast for lighter than air aircraft which increases the per pound effectiveness of ballast, thereby extending its maneuverability or it useful time aloft or both.

Generally the present invention comprises a method for improving the flight control of a lighter than air aircraft by utilization of non-jettisonable improved ballast, comprised of at least one tank of a lighter-than-air gas in liquid form. Lighter than air gases include the preferred helium as well as hydrogen, ammonia and methane. Depending on circumstances and costs other gases, such as hydrogen and ammonia, may be more preferred in locations where helium is very costly. The tank containing the liquefied gas is adapted to maintain the liquefied gas in such state for at least the expected duration of the flight and the attendant handling times or, at the very least for at least a useful part of the flight time, such as in situations where the liquid gas is evaporated well before the end of the flight. The tank is further adapted to be connected to the existing gas lift compartments of the aircraft, whereby, when additional lift is required, a measured portion of the liquefied gas is released into the gas lift compartment and vaporized (vaporization may be effected prior to entry into the gas lift compartment as well). There is no jettisoning of ballast (with possible attendant drop problems) and lift is much greater (up to seven times greater) than that obtainable with prior art dead weight ballast.

Thus, dead weight ballast such as sand bags provides an equivalent pound for pound lift, i.e., jettisoning of one pound of ballast provides one pound of additional lift. With the present invention, not only is the weight of the liquefied gas removed there is a further substantial increase in buoyancy achieved as a result of the additional lighter-than-air gas added to the gas lift compartments.

As an example, existing insulated gas tanks capable of holding liquid helium in liquid form have a dead weight about equal to that of the liquid helium contained therein. A pound of liquid helium when vaporized is capable of lifting 6.2 pounds of weight. Accordingly, by subtracting the dead weight of the helium, one pound of liquid helium provides an ideal ballast increase of 7.2 pounds. In any particular situation a certain amount of weight will be set aside for ballast. The containers for the liquid gas must take up part of the weight. With the prior art container weight taken into account this means that each pound of simple ballast such as sand would be replaced by half a pound of helium and half a pound of container, which still is more than three and a half times that achievable with standard ballast. Greater efficiency in the weight of the holding tanks will provide even greater efficiencies for the liquefied gas ballast. For the ultimate time aloft, in some circumstances it would be possible to drop the containers themselves although this might not often be done for economic reasons since such containers are relatively costly. The containers may also be dropped as emergency ballast, regardless of expense.

This and other objects, features and advantages of the present invention will become more evident from the following discussion and drawings in which:

SHORT DESCRIPTION OF THE DRAWINGS

FIG. 1 schematically depicts a prior art balloon with standard ballast; and

Figure 2:
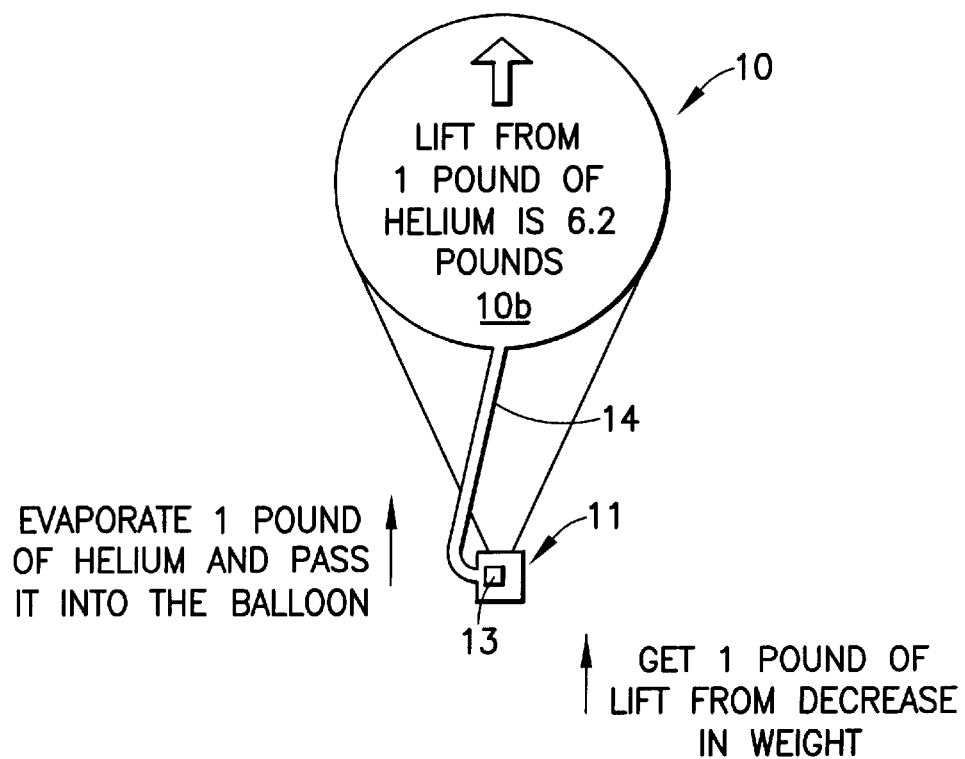

FIG. 2 schematically depicts the same balloon as in FIG. 1 but with the non-jettisonable ballast of the present invention.

DETAILED DESCRIPTION OF THE DRAWINGS AND THE PREFERRED EMBODIMENT

The present invention is applicable to all types of commonly utilized lighter than air aircraft, including balloons, dirigibles, blimps, airships and hybrid lighter than air crafts which obtain part of their lift from lighter than air gas. The commonly used lifting gases include helium and hot air, with hydrogen (less popular because of flammability problems), methane and ammonia. The criteria for the gas used in the ballast of the present invention is that they may be liquefied and are readily stored in liquid form and that they are lighter than air (essentially lighter than nitrogen) when vaporized under ambient conditions. Aside from hydrogen, helium is the lightest gas and is preferred because of its stability. Helium has a lifting capacity of 1.06 kg/M$^3$ or 0.0660 lb/ft$^3$ at typical sea level conditions and a 24 foot diameter balloon can lift about 455 pounds. A pound of helium can therefore provide an additional lift of 7.2 pounds.

As seen in FIG. 1, balloon 10 with basket 11 and ballast 12 obtains an additional lift of 1 lb/lb of jettisoned ballast such as sand bags. As seen in FIG. 2, tank 13 with contained liquid helium is connected to the gas compartment 10b of balloon via gas line 14. Liquid helium is released from the tank 13 and because of the temperature difference between the boiling point of helium of −268.93° C. and ambient, there is immediate vaporization with pressurization (though minimal) whereby the helium enters the gas lift compartment to increase lift by 6.2 pounds per pound of helium plus the additional pound of helium which is subtracted from the weight of the entire balloon and basket, i.e., the equivalent ballast weight.

If necessary, the storage tank or a Dewar container is provided with pump means to effect a transfer of the vaporized gas such as helium into the gas lift compartment. One way gas valves in the line leading to the gas lift compartment may also be utilized to ensure transfer without reversal.

Commercially liquid helium Dewars are available for example from companies such as Cryofab in Kenilworth, N.J., in sizes ranging from 5 to 7500 liters. Since the helium transfer is not a liquid transfer, gas line 14 need not be thermally insulated but must be able to withstand the sudden temperature variation if the helium is pumped directly thereinto. Alternatively, a heat exchanger may be utilized to warm the gas enough to avoid damage to the material of the balloon.

It is understood that the above description and drawings are only exemplary of the present invention and that changes may be made in materials, components, structure and the like without departing from the scope of the present invention as set forth in the following claims:

What is claimed is:

1. A method for improving the flight performance of a lighter than air aircraft comprising the step of using a non-jettisonable ballast, comprised of a lighter-than-air gas in liquid form contained within at least one insulated container therefor, wherein the container is connected via a gas line to an existing gas lift compartment of the aircraft, said compartment at least partially filled with a lifting gas, whereby, when additional lift is required, a measured portion of the liquefied gas is vaporized and released into the gas lift compartment, wherein the vaporized gas becomes mixed together with the lifting gas, and wherein, prior to such entry of the vaporized gas into said gas lift compartment the temperature of said vaporized gas is increased due to operation of a separate heat exchanger operatively associated with said gas line whereby damage to the compartment, by excessive cooling, is minimized, and wherein the lift provided by vaporizing all the gas in the container is greater than the weight of said container and liquid gas.

2. The method of claim 1, wherein the gas is helium.

3. A lighter than air aircraft comprising a non-jettisonable ballast comprised of a liquefied lighter than air gas contained within an insulated container, means for release and vaporization of the liquefied gas, means for transfer of the vaporized gas to a lift compartment of the aircraft, said lift compartment at least partially filled with a lifting gas, and heat exchanger means, separate from said transfer means and operatively associated therewith, for increasing the temperature of said vaporized gas prior to entry of said vaporized gas into said lift compartment, wherein said vaporized gas becomes mixed together with said lifting gas, whereby damage to said compartment, by excessive cooling, is minimized.

4. The aircraft of claim 3, wherein the gas is helium and the container is adapted to insulatively hold said helium in the liquid state until said vaporization is effected.

5. The aircraft of claim 3, wherein the gas is ammonia and the container maintains the pressure of the ammonia to keep the ammonia in a liquid state.

* * * * *